Aug. 22, 1967     E. M. WALLACE ETAL     3,336,667
PRUNING CUTTER
Filed Nov. 19, 1964     4 Sheets-Sheet 2

INVENTORS.
EDWARD M. WALLACE
BY WALLACE M. PRESTON
*Kenwood Ross*
ATTORNEY.

3,336,667
PRUNING CUTTER
Edward M. Wallace, Longmeadow, and Wallace M. Preston, West Springfield, Mass., assignors to Wallace Mfg. Corp., West Springfield, Mass.
Filed Nov. 19, 1964, Ser. No. 412,520
16 Claims. (Cl. 30—135)

The present invention relates generally to new and useful improvements and structural refinements in pruning cutters of the anvil and pass-by types and is directed more particularly to an included means for seizing and maintaining a firm supporting grip on the severed part of a tree, bush, vine or plant being pruned wherefore the severed part or workpiece may be placed elsewhere and deposited without being touched by the operator's hand.

Pruning cutters are peculiarly suitable for use in cutting off such as the fragile blooms of flowering plants or bunches of grapes or the like which would otherwise be dropped and injured, particularly when the operator's implement-free hand is engaged in bracing himself or in steadying the vine or plant bearing the part being severed so as to be unavailable for the grasping of the latter.

The term "anvil type," as used in cutlery, is understood to mean any type of cutting instrument where a cutting edge abuts the face of an anvil. However, it is to be understood ab initio that the principles of the invention can be applied with equal vigor to shears of the pass-by type where one cutting edge wipes along and past the other to make the cut, or where cutting blades are provided on both jaws in manner such that they overlap as they close, and to that end, cutting instruments of this type are disclosed herein as a modified form of this invention.

Numerous types of workpiece-holding pruning cutters are presently available on the commercial market, but these are deficient in certain respects. For instance the workpiece-contacting faces of the gripping elements associated with their cutting jaws are generally arranged parallel to the workpiece-engaging edges or faces of the cutting jaws to present an outwardly diverging V-shaped arrangement of their workpiece-contacting edges or faces throughout the closing movement of the jaws. Consequently, unless the growth being pruned is held firmly in the mouth of the cutting jaws by the implement-free hand, there is tendency of the jaws to injure the branch or the like, through the pinching or squeezing action, particularly when the branch or the like is hard, round and/or slippery. With the workpiece-contacting faces of the gripping elements arranged parallel to the corresponding faces or edges of the cutting jaws, the intended function of the gripping elements is counteracted by the workpiece-expelling action of the cutting jaws in a one-hand pruning attempt. As another disadvantage, many types have incorporated openings or other suitable fastening means in the blades so as to add appreciably to production costs and to deleteriously effect the blades by weakening same. As still another disadvantage, the holding means, by being directly fastened to the blades, allow gummy substances, such as flowing plant juices, resultant from cutting action, to interfere with normal optimum operation. As still another disadvantage, such prior art constructions have been useful and practical only for light growths, they being not successfully employed for cutting heavy growths.

With the foregoing disadvantages of the prior art workpiece-holding pruning shears fully in mind, it is our primary object to provide an improved workpiece-holding device for attachment to existing pruning cutters or incorporation into the structure at the time of manufacture, which device includes a fixed gripper element on one implement jaw, called the anvil, and a spring-biased gripper element related to the other implement jaw, called the cutting blade, so as to coact with the fixed gripper element in such manner that, as the workpiece of a tree or bush or vine or plant is being severed, by the closing action of the fixed gripper element or anvil and the cutting blade, the spring-biased gripper element cooperantly with the fixed gripper element offers a temporary restraining means for holding the severed part.

It is another object to teach pruning cutters and/or pruning shears capable of accommodating extremely heavy growth.

As another feature worthy of particular notice, we provide pruning cutters and/or pruning shears wherein openings extending through or equivalent fastening devices secured to the cutting members are eliminated, wherefor the costs of same are obviated and the dangers of structurally weakening such components are eliminated.

Another object hereof is to teach the avoidance of fastening the holding devices to the cutting blade members so as to preclude the accumulation of gummy substances therearound during operational use, wherefore normal operations are not hindered.

The pruner hereof comprehends a device which gives a pronounced slicing action so as to pull the work into, rather than to force it away from, the maximum leverage area at the throat of the implement jaws, and wherein the cutting jaws are held in substantially parallel relation as to each other so that the work is not thrust away from the fulcrum, for herein are envisioned constructions in which the cutting jaw members are held in relatively widely-spaced relationship, when in opened position, so as to allow the accommodation of extremely heavy or thick growth, and assume substantial parallelism as they are motivated into closed position, all so as to offer an action wherein the cutting jaws actually draw the work into the mouth of the cutting jaws as the pruning cutter is closed. The exerted in-drawing force, i.e. the pull, on the workpiece precludes egress or the frequently-encountered endwise expulsion from between the implement jaws because of the squeezing action thereof as they close on the workpiece.

Without intending to place undue limitations upon the scope of the invention beyond what may be required by the state of the prior art, the embodiments defined herein may be broadly described as embracing the concept of a pruning cutter characterized by a pair of jaws having adjacent inner faces which move substantially in parallelism relative to each other between opened and closed positions, spring-loaded gripper means pivotally related with respect to one of said jaws for holding the work, and a pair of handles for effectuating the opening and closing of said jaws and for holding same in any desired opened or closed or intermediate position, and further characterized by a motivating link which, as the pruning cutter is opened, swings the rear end of one of the jaws, the anvil, away from the cutting edge of the other jaw, the cutting blade, so as to achieve a wider opening between the cutting edge of said cutting blade and the anvil face of said anvil at the location of maximum leverage, thereby permitting easy and ready cutting of heavy growths. Additionally, the motivating link maintains substantial parallelism between the anvil face and the cutting edge throughout the opening and/or closing movements, thereby avoiding the frequently encountered slippage of work when cutting heavy growths.

With particular reference to the modified form shown, it is to be conceded that it has been known to employ the conventional scissors action in a shears with the cutting jaws opening and closing in the normal crossed and pivotal relationship with respect to each other. Such have the obvious objection that the apex of the V-shape opening lies forwardly of the pivot thereof. Therefor, as maximum leverage is obtained, the work tends to be forced away from the maximum leverage area at the throat of the cutting jaws to preclude the cutting of relatively large branches positioned in the jaws near the pivot point. Stated otherwise, shears of this type usually give a rolling out by offsetting the fulcrum point which causes the blades to close with a V or scissors action, wherefor there is a tendency to slide the work being cut toward the outer ends of the blades.

We, by the inclusion of spring-biased gripper means related to one of our cutting jaws, have overcome such work-sliding tendency wherefore the work is held firmly so that clean and straight cuts are obtained.

Another object hereof is to provide a pruning cutter wherein a sliding action of the anvil is intentionally precluded in order to avoid the distadvantageous features of sloppiness between parts and of friction with its attendant wear.

As a still further refinement, we provide an inoffensive and positive safety locking means for holding the pruning cutter in a closed, inoperative position, when not in use, which means is so designed as to preclude unwanted catching or hooking on clothing when the tool is being carried on the person.

Still another feature worthy of particular notice is the provision of a means normally biasing the pruning cutter into opened position, same, like so many of the unique features hereof, being concealed so as to be inconspicuous and non-observable by the average eye.

We envision, in a pruning cutter, the combination of a lower handle configured to have a rearwardly-extending hand grip portion and a forwardly-extending off-set portion in the form of a pair of spaced flanges, a first jaw member or cutting blade rigidly secured between the outer end portions of the said spaced flanges and having a downwardly-facing working edge, an upper handle pivotally interconnected to the spaced flanges of the lower handle and configured to have a hand grip portion extendible rearwardly of and an offset portion (in the form of spaced flanges) extendible forwardly of the pivotal interconnection of the upper and lower handles, a second jaw member or anvil pivotally interconnected to the spaced flanges of the upper handle and having an upwardly-facing working face adapted for line contact with the working edge of the first jaw member, and a spring-loaded work gripping means pivotally interconnected to the spaced flanges of the upper handle and having a downwardly-facing working face adapted for line contact with a workpiece, all uniquely coacting through a motivating ling pendulantly mounted upon the lower handle in a plane rearwardly of the plane of the pivotal interconnection of the handles and having a lower extremity pivotally interconnected to the second jaw member in a plane rearwardly of the plane of the pivotal interconnection of the handles. The mouth defined by the jaw members, when the handles are in extended or opened position, is closely adjacent the pivotal interconnection of the handles, and as the hand grip portions of the handles are brought together, the second jaw member is constrained so as to bring the working face thereof into line contact with the working edge of the first jaw member, and the workpiece is held against rolling or sliding movement between said anvil and gripping means by the spring-action of said gripping means.

These and other incidental ends and advantages will be obvious and apparent and will be more fully pointed out as the nature of the invention and the characteristic features, which we consider to be novel, are better understood from a consideration of the following detailed description, when read in conjunction with the accompanying drawings in which:

FIG. 1A is a fragmentary view in side elevation showing the spring-biased gripper element and one of the biasing leaf springs associated therewith;

The specific phraseology or terminology herein employed is not used for purposes of limitation, the terms and expressions being intended to be as generic in their application as the art will permit. For instance, we have shown, for purposes of illustration, what we denominate as a cutting blade and an anvil, although it will be understood that any type of cutting jaw might be substituted therefor within the spirit of the invention.

The workpiece-holding means has been disclosed in two presently-contemplated embodiments wherein it may be advantageously incoroporated, a pruning cutter (FIGS. 1–5) and a pruning shears (FIGS. 8–11).

Figures 1, 1F, 2:
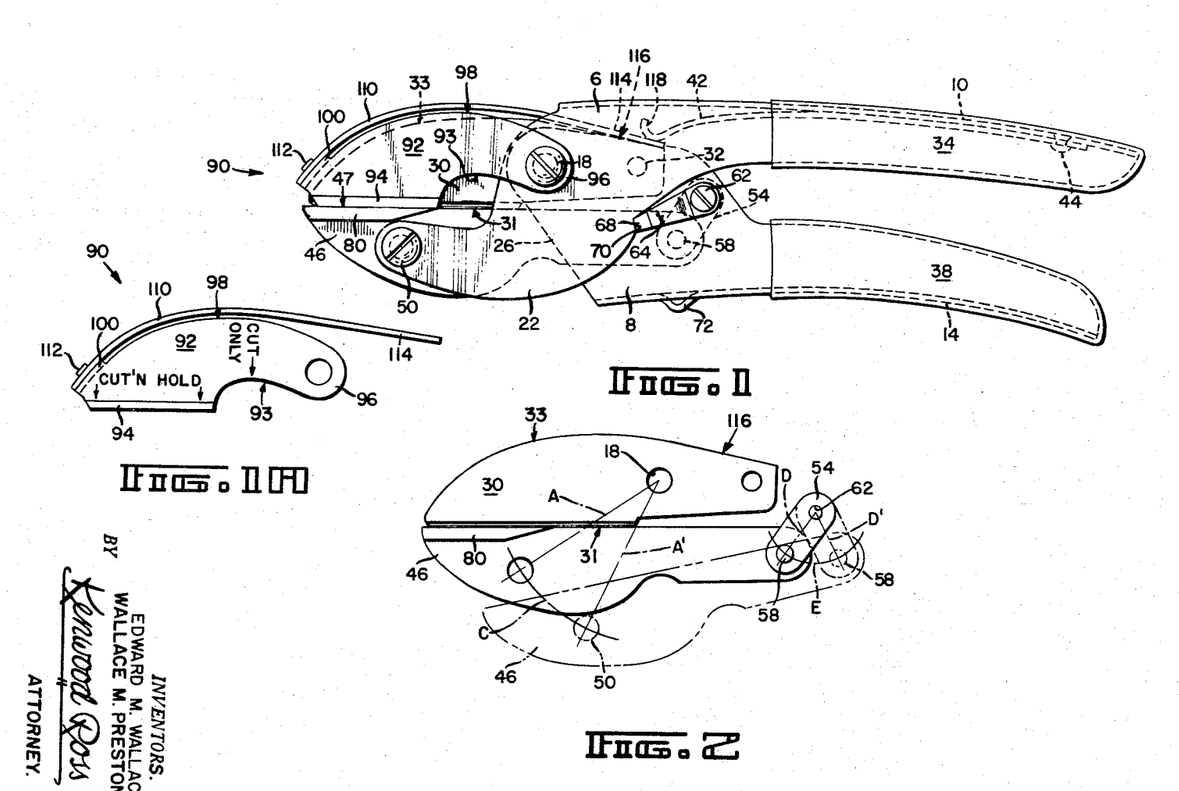
FIG. 1 is a view in side elevation of the pruning cutter of the invention in the normally-closed position.
FIG. 2 is a diagrammatic view in side elevation showing the relationship between the jaws and motivating link of the pruning cutter of FIG. 1 in both the closed and opened positions and dramatizing the pivotal movement of the motivating link and its capacity for positioning the face of one of the jaws with respect to the face of the other of the jaws.

The pruning cutter includes a pair of relatively movable upper and lower handle members or levers 10 and 14 respectively pivotally interconnected together for relative swinging movements on a transversely-extending pivot pin 18 extending through and between the spaced parallel side walls or flanges 6, 6 and 8, 8 respectively of said handles, said handles being each preferably, but not obligatorily, formed or configured in U-shaped construction in cross section, the two components being oppositely disposed with respect to each other so that the forwardmost portions of side walls or flanges 6, 6 project forwardly in offset manner to form forwardly-extending jaw bearing extensions 22, 22 while the forwardmost portions of side walls or flanges 8, 8 project forwardly in offset manner to form side blade bearing extensions 26, 26. Upper handle member 10 is formed with a wider U-shaped cross section than lower handle member 14 wherefore side blade bearing extensions 26, 26 of the lower handle member are positionable within and contiguous to jaw bearing extensions 22, 22 of the upper handle member.

The rearward ends of upper and lower handle members 10 and 14 may be provided with cushioned hand grips 34 and 38 respectively.

At this juncture, it may be explained that the term "handle" is used in the trade to embrace both the normally elongated rearwardly-extending manipulating portion and the normally shorter shank portion immediately adjacent the pivotal interconnection, to which shank portion, a workpiece-engaging jaw is added, either as an integral part thereof or as an attachment thereto.

A downwardly-facing cutting blade or jaw 30 is secured to and is disposed between side blade bearing extensions 26, 26 of lower handle member 14 as by a transversely-extending rivet 32 extending through the side blade bearing extensions and cutting blade or by other suitable instrumentation. The cutting blade or jaw may be in the form of a V-type blade having a straight cutting edge 31 and a smoothly-curved longitudinally-convex outer margin 33 which merges with said cutting edge to define a nose at the forwardmost end of the jaw.

The upper and lower handle members are adapted to be held in normally-open position by an elongated leaf spring 42, sometimes identified as a secondary spring or helper spring or auxiliary spring or handle-biasing spring, attached at its rearward end portion to the upper handle member as by a rivet 44 or equivalent and cantilevered forwardly. Additionally to its handle-opening function, said leaf spring serves to augment the biasing pressure of another spring, hereinafter to be delineated.

The implement chosen for illustration in FIG. 1 is of that type which employs an anvil of comparatively soft metal on the shank portion of one handle for engagement by a cutting blade affixed to the shank portion of the other handle, and upper handle member 10 is represented as having an anvil or jaw 46 which generally conforms in profile to the cutting blade or jaw 30, and has a flat, planar upwardly-facing anvil face 47, is disposed between jaw-bearing extensions 22, 22 of upper handle member 10, extends rearwardly between spaced side walls 8, 8 of lower handle member 14, and is pivoted to said extensions by a pivot pin 50.

Anvil face 47 of the anvil or jaw is arranged to underlie and to bear flatly against the opposed cutting edge 31 of cutting blade or jaw 30 in parallel confrontation therewith, when the jaws are in fully-closed position.

The lower end of a motivating link 54 is pivotally connected at 58 to the rearward end portion of anvil 46 and the upper end of said motivating link is pendulantly mounted at 62 on lower handle member 14, wherewith the anvil forms in effect a floating lever pivoted upon pivot pins 50 and 58.

A latch 64 is pivoted at its uppermost end by pivot 62 to one of the side walls 8 of lower handle member 14 and has a lowermost free end 68 receivable in a seating manner in a complemental notch 70 in one of the side walls 6 of upper handle member 10, when the handle members are in the closed position, therewith to preclude unwanted opening thereof.

When the pruning cutter is manually grasped, the user's fingers will be preferentially positioned beneath lower handle member 14 adjacent a finger guard 72 struck outwardly or downwardly from the lower planar surface of said lower handle member, whereupon the thumb may be dexterously brought into embracing position against latch 64 for rotating same out of seated position within notch 70 to an unlatched position, thereby to free the pruning cutter from its locked position and accordingly to render it operative.

A rigid gripper element integral with the anvil or jaw 46 is provided and a spring-biased gripper element is pivotally related to the other cutting blade or jaw 30 in opposed coacting relation to the rigid gripper element.

The rigid gripper element, numbered 80, is preferably, although not obligatorily, formed integrally with anvil and jaw 46 and extends laterally outwardly therefrom so as to allow a workpiece-contacting face which is coplanar with inner anvil face 47 of the anvil or jaw, which workpiece-contacting face is in coacting opposition to the corresponding face of the spring-biased gripper element, presently to be described. That is, rigid gripper element 80 is so positioned, with regard to anvil or jaw 46, that its workpiece-contacting face is offset outwardly from anvil face 47 to the end that the rigid gripper element will not be unnecessarily subjected to the strong cutting force exerted by the cutting jaw coming into confrontation with the anvil.

The spring-biased gripper element, generally indicated by 90, comprises a body portion 92, positioned in contiguous side-by-side relationship to cutting blade 30, a gripper flange 94 extending laterally outwardly from the lower edge of said body portion so as to overlie rigid gripper element 80, and a tank portion 96 extending rearwardly from said body portion and pivotally mounted with respect to the upper and lower handle members. In the form shown in FIG. 1, said gripper element is shown as being pivotal upon pivotal connection 18, although it is to be stated that it is within the purview of this invention otherwise to pivotally mount the gripper element, such for example as by a separate pivot pin, all so as to achieve the desideratum of allowing pivotal movement of the gripper element relative to the upper handle member for the operational reason that with the cutting blade pivoted with respect to the upper handle member the gripper element desirably travels with the cutting blade during the moments of gripper element non-operativeness, it being rendered operative and accordingly pivoting relative to the upper handle member as well as relative to the cutting blade with the introduction of a workpiece between the cutting blade and anvil and the closing movement of said components toward each other by the compressing of the handle members toward each other.

Spring-biased gripper element 90 has a smoothly-curved longitudinally-convex upper edge 98 of substantially the same configuration as the outer margin 33 of cutting blade 30 and has an integral laterally-offset portion 100 overlying said outer margin 33 in manner to permit an end of a leaf spring 110, sometimes called a main spring or primary spring or semi-elliptic spring, to be fixed in cantilever manner to the spring-biased gripper element such as by a rivet 112 extendible through the leaf spring and laterally-offset portion 100 or equivalent substitute means.

The rearward portion of body portion 92 of the spring-biased gripper element may be provided with a cutaway portion 93 extending upwardly from the plane defined by gripping flange 94, which cutaway portion delineates an exclusive cutting area as distinguished from a cutting and holding area forwardly thereof. That is, within the cutting and holding area, the spring-biased gripper element is adapted to engage the workpiece by way of holding the same as it is cut, whereas within the exclusive cutting area, the cutaway portion provides a clearance whereby the workpiece-holding function is not called into play during the workpiece-cutting process.

Main leaf spring 110 is characterized as being semi-elliptic so as substantially to conform to the curvature of outer portion 33 of cutting blade 30 and is cantilevered so as to have an innermost end 114 which passes between side walls 6 of upper handle member 10 to permit it to bear upon back 116 of tang 96 of cutting blade 30 thereby to yieldingly support a load through the permitted bending action.

A curved innermost or forwardmost end 118 of secondary leaf spring 42 bears upon innermost end 114 of main leaf spring 110 in manner such that the closing action of the handle members will serve to increase the deflection of the secondary spring thereby loading or increasing the pressure exerted upon the main spring and accordingly augmenting the biasing pressure of the main spring upon the gripper element. The spring devices are of substantially like configuration in the bending plane and are so interrelated by the bearing of one upon the other so as to bend simultaneously or as a unit. In this manner, the free end of the secondary spring enjoys relative approach or recession with respect to the free end of the main spring so as to provide a thrust or influencing force leading to the gripping action of said gripper element upon a workpiece and holding same in situ relative to the anvil.

The springs of the pair thereof are thus observed, as will be appreciated by reference to FIGS. 5A and 5B, to distort during the compression of the handle members and to restore during the opening of the handle members.

Figure 3:
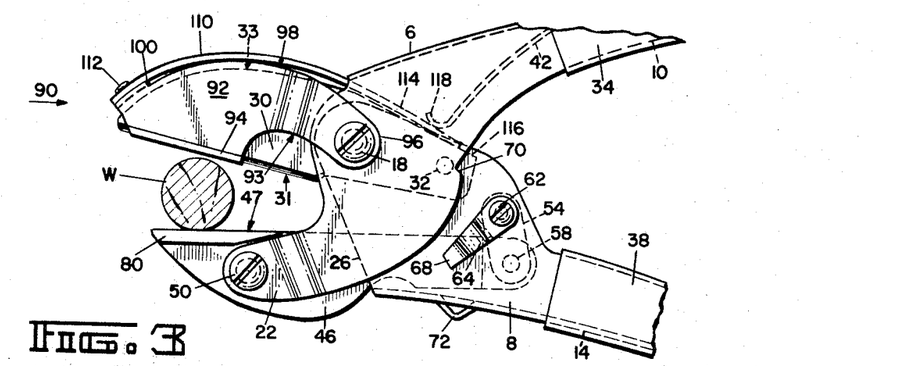
FIGS. 3, 4 and 5 are fragmentary views in side elevation of the pruning cutter of FIG. 1 with a heavy branch shown in relation thereto in the fully-opened, cutting, and fully-cut positions respectively.

By the spring-loaded pivotal arrangement of spring-biased gripper element 90, when the jaws of the cutter are opened to receive a workpiece W therebetween, the gripper element moves with cutting blade 30, as shown in FIG. 3.

When the cutting blade is moved downwardly in its cutting stroke, the workpiece is gripped firmly between and constrained by gripping flange 94 of the spring-biased gripper element and the rigid gripper element on anvil 46, the portion-to-be-severed being located on the same side of the cutting blade as the gripper element.

Figure 4:
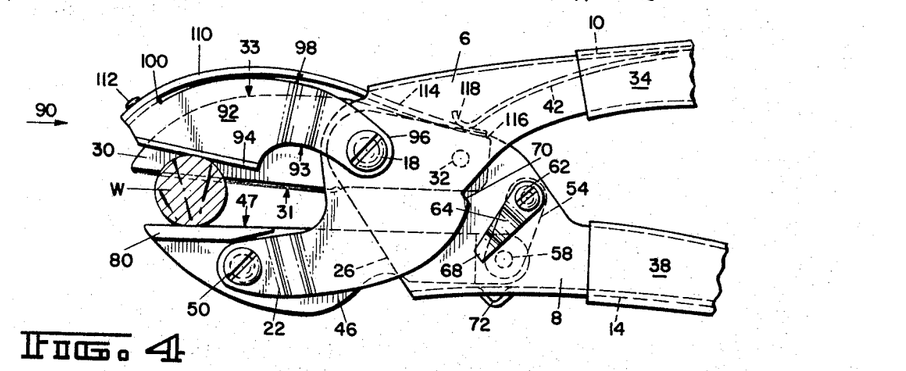

As the user continues to apply a compressive force to handle members 10 and 14, cutting blade 30 is moved downwardly through workpiece W and spring-biased gripper element 90 pivots in a counter clockwise direction upon the pivotal connection 18 to set up tension in leaf spring 110 whereby workpiece W continues to remain firmly gripped between gripping flange 94 and rigid gripper element 80, as shown in FIG. 4.

Figure 5:
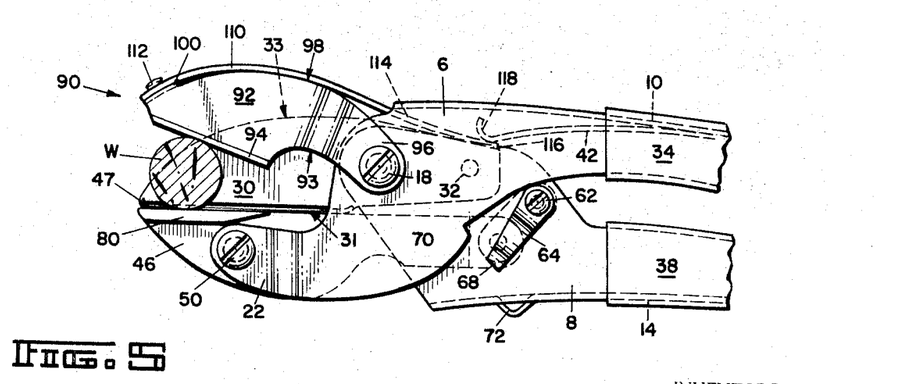
Figure 6:
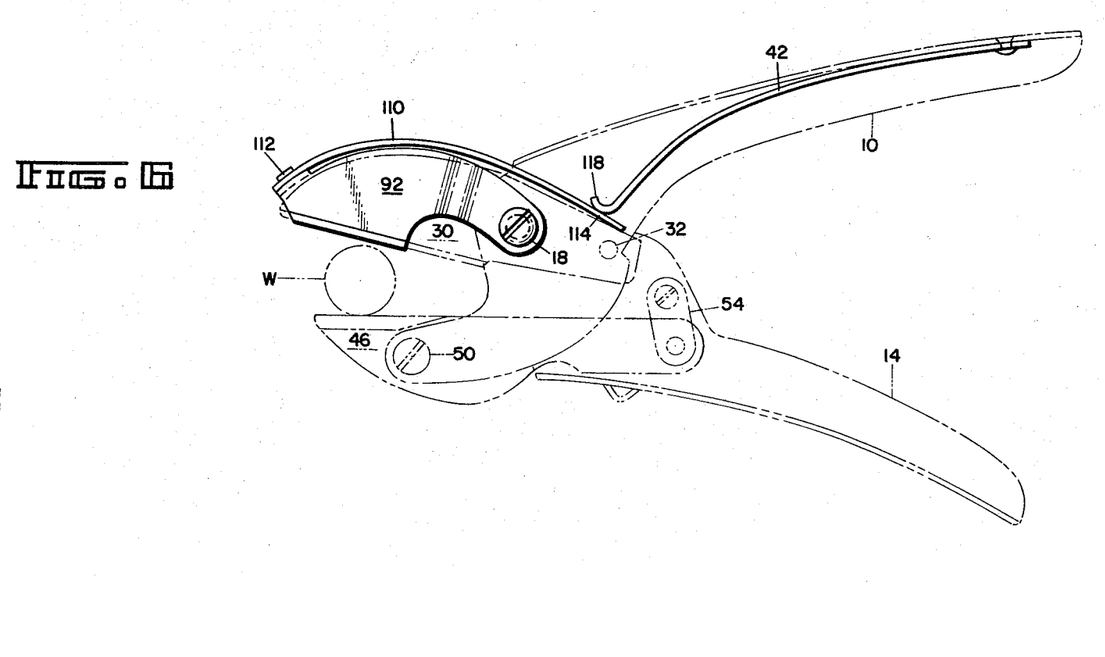
FIGS. 6 and 7 are views in side elevation, with all but certain components in phantom, and showing the interrelationship of the spring devices in the opened and closed workpiece-gripping positions respectively.
Figure 7:
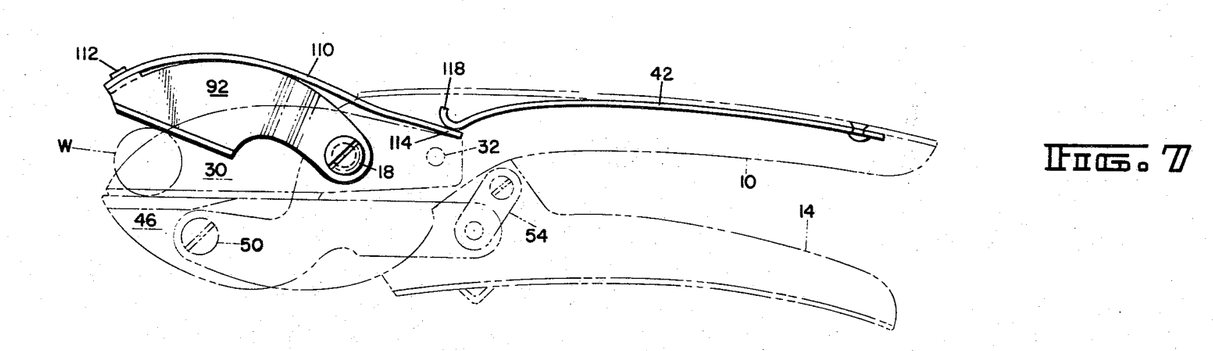

Even after cutting blade 30 has passed completely through the workpiece, as shown in FIG. 5, the now-severed portion of the latter remains gripped between elements 80 and 94 until the user releases his force upon the handles, whereupon the jaws are opened and the spring-biased gripper element returns to its normal or rest position with respect to cutting blade 30.

In FIG. 2, we illustrate schematically the forward and generally horizontal movement of anvil 46 relative to cutting blade 30 as said members are motivated from opened to closed positions. The center lines A and A′, drawn between pivot points 18 and 50, delineate an arc C traversed by pivot 50 in the traversing movement of the anvil, while the center lines D and D′, drawn between pivot points 58 and 62, delineate an arc E traversed by pivot 58 in the traversing movement of the motivating link. As the hand grip portions of the handle members are brought toward each other, the anvil is constrained so as to effectuate the movement of the working edge of the anvil into line contact with the working edge of the cutting blade. The moving together of handle members 10 and 14 effectuates the pivoting of anvil 46 on pivot 50 and brings it into substantially parallel relation with cutting blade 30.

In FIGS. 8–11, we have illustrated the principles of the invention as applied to cutting shears of the pass-by type where one cutting edge wipes along and past the other to make the cut.

Figure 8:
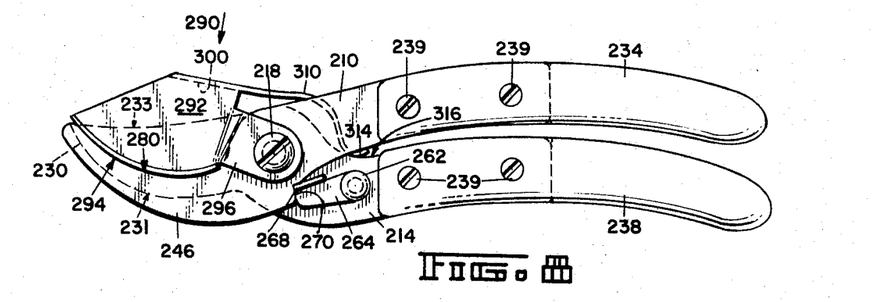
FIGS. 8 and 9 are views in side elevation and top plan respectively of a modified form of structure employing the principles of the invention showing the device in the normally-closed position.
Figure 9:
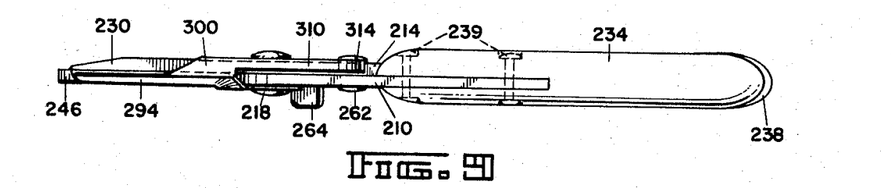

The cutting shears include a pair of relatively movable upper and lower handles or gripping members or levers 210 and 214 respectively pivotally interconnected together for relative swinging movements on a transversely-extending pivot 18 extending therethrough.

The rearward ends of upper and lower handles 210 and 214 may be provided with hand grips 234 and 238 respectively which may be fixed thereto as by screws 239 or equivalent.

The term "handle" will be understood to embrace both the rearwardly-extending manipulating portion and the short shank portion immediately adjacent the pivot, to which shank portion the workpiece-engaging jaw is added in the present embodiment as an integral part.

A downwardly-facing cutting blade 230 is provided at the forwardmost end of lower handle 214 and is in the form of a V-type blade having a smoothly-curved longitudinally-convex cutting edge 231 and a substantially straight outer margin 233 which is blunt throughout the greater portion of its length, the outer margin merging with the cutting edge at the forward end of the blade, as shown.

The cutting blade will be observed to wipe past a cooperating jaw, wherefore upper handle 210 is represented as having a curved jaw 246 formed integrally therewith, said jaw having an upwardly-facing smoothly-curved longitudinally-concave workpiece supporting surface 280 which is blunt throughout its length. The cutting edge 231 of cutting blade 230 is adapted to wipe past workpiece supporting surface 280 as both jaws are motivated to fully-closed position.

A latch 264 is provided which is pivoted at its uppermost end by a pivot 262 to lower handles 214.

A lowermost or forewardmost free end 268 of latch 264 is receivable in a complemental notch 270 in upper handle 210, when the handles are in fully-closed position so as to preclude unwanted opening thereof.

With the cutting shears grasped by the hand of the user, his fingers will be preferentially positioned beneath lower handle 214 whereupon his thumb may be dexterously brought into embracing position against latch 264 for rotating same out of its seated position within notch 270 to an unlatched position, all so as to free the cutting shears from its locked position and thereby to render it operative.

The upwardly-facing workpiece supporting surface 280 of jaw 246 serves as the rigid gripper element, and a spring-biased gripper element is mounted on cutting blade 230 in opposed relation to said workpiece supporting surface.

The spring-biased gripper element, generally indicated by 290, comprises a body portion 292 positioned in contiguous side-by-side relationship to cutting blade 230, a longitudinally-curved convex gripping flange 294 extending laterally outwardly from the lower edge of said body portion so as to overlie workpiece supporting surface 280 on cutting blade 230, and a tang portion 296 extending rearwardly from said body portion and pivoted at its rearward end to upper handle 210 at pivotal connection 218.

Figure 10:
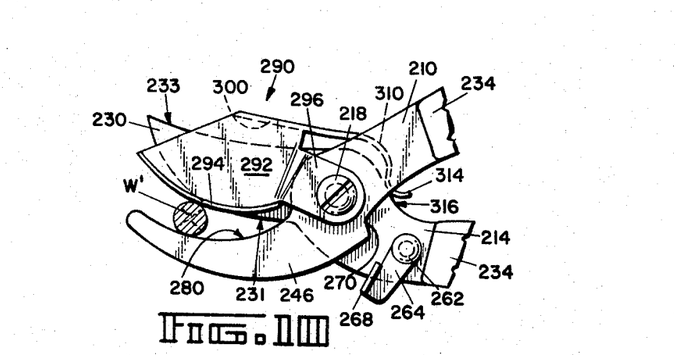
FIGS. 10 and 11 are fragmentary views in side elevation of the device of FIGS. 8 and 9 showing a heavy branch in relation thereto in the about-to-cut and fully-cut workpiece-gripped positions respectively.

Spring-biased gripper element 290 has an integral laterally-offset portion 300 overlying outer margin 233 of cutting blade 230, said laterally-offset portion extending rearwardly from body portion 292 to form a leaf-spring 310 having a curved innermost or rearwardmost end 314 which bears directly upon an upper edge 216 of lower handle 214. By this spring-loaded pivotal arrangement of spring-biased gripper element 290, when the jaws of the cutter are opened to receive a workpiece $W^1$ therebetween, the spring-biased gripper element moves with cutting blade 230. When the cutting blade is moved downwardly in its cutting stroke, the workpiece is gripped firmly between the curved, downwardly-facing gripping flange 294 of the spring-biased gripper element and the complementally-curved workpiece supporting surface 280 on jaw 246.

As the user continues to apply a compressive force to the handles 210 and 214, cutting blade 230 is moved downwardly through workpiece $W^1$ and spring-biased gripper element 290 pivots upon pivotal connection 218 to set up tension in leaf spring 310 whereby the workpiece continues to remain firmly gripped between gripping flange 294 and workpiece supporting surface 280 on jaw 246.

Figure 11:
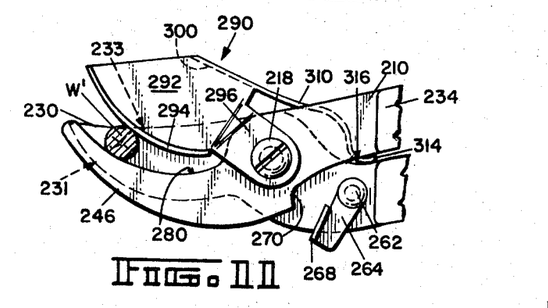

Even after cutting blade 230 has passed completely through the workpiece and has wiped past jaw 246, the now-severed portion of the workpiece remains gripped between the jaw and the spring-biased gripper element until the user releases the force upon the handles, whereupon the jaws are opened and the spring-biased gripper element returns to its normal or rest position with respect to cutting blade 230.

It is believed that the gist of the invention will be understood from the foregoing disclosure. Accordingly, further analysis thereof is considered unnecessary. We have, in accordance with the provisions of the patent statutes, described the construction and principles of operation of our invention together with the structures which we believe to represent the best embodiments thereof, to the end that others can, by applying current knowledge, readily adapt them for various applications. The substitution of equivalents and other changes, modifications and alterations, as circumstances may suggest or render expedient, are reasonably contemplated, the invention being susceptible of such, without departing from its real spirit or underlying principles. Such alternate constructions and/or adaptions are intended to be comprehended within the meaning and purview and range of equivalence of the below subjoined claims, in which we claim:

1. A cutter comprising in combination, a lower handle having a rearward hand-grip portion and a forward primary jaw portion, the forward primary jaw portion of said lower handle having a downwardly-facing working edge, an upper handle having a rearward hand-grip portion and a forward secondary jaw portion, the forward secondary jaw portion of said upper handle having an upwardly-facing working face, pivot means pivotally interconnecting the forward primary and secondary jaw portions of said lower and upper handles respectively, workpiece-gripping means supported in cooperative relation to the primary and secondary jaw portions of said lower and upper handles respectively and including a cantilevered gripper element supported at its inboard end with a pivotal mounting with respect to said upper and lower handles and having a free unsupported outboard end movable in yielding relation with respect to the primary and secondary jaw portions of said lower and upper handles respectively and a spring-biasing means fixed to the gripper element of said workpiece-gripping means forwardly of said pivot means and bearing upon the primary jaw portion of said lower handle rearwardly of said pivot means, the gripper element of said workpiece-gripping means being positioned in opposed relation to said upwardly-facing working face of the secondary jaw portion of said upper handle for contact therewith when the jaw portions of said handles are in closed position relative to each other.

2. A cutter comprising in combination, a lower handle having a rearward hand-grip portion and a forward primary jaw portion, the forward primary jaw portion of said lower handle having a downwardly-facing working edge, an upper handle having a rearward hand-grip portion and a forward secondary jaw portion, the forward secondary jaw portion of said upper handle having an upwardly-facing working face, pivot means pivotally interconnecting the forward primary and secondary jaw portions of said lower and upper handles respectively, workpiece-gripping means supported in cooperative relation to the primary and secondary jaw portions of said lower and upper handles respectively and including a freely suspended gripper element in side by side relationship with the jaw portions and having an inboard end pivotally mounted upon said pivot means and movable adjacent and in yielding relation with respect to the primary and secondary jaw portions of said lower and upper handles respectively and having at its outboard end the outboard end of a spring-biasing means fixed thereto, the opposite inboard end of the spring-biasing means bearing upon the primary jaw portion of said lower handle rearwardly of said pivot means, the gripper element of said workpiece-gripping means being positioned in opposed relation to said upwardly-facing working face of the secondary jaw portion of said upper handle for contact therewith when the jaw portions are in closed position relative to each other.

3. A cutter comprising in combination, a lower handle having a rearward hand-grip portion and a forward jaw portion with the jaw portion having a downwardly-facing working edge, an upper handle having a rearward hand-grip portion and a forward jaw portion with the jaw portion having an upwardly-facing working edge, a handle pivot pivotally interconnecting said upper and lower handles intermediate the respective hand grip portions and the jaw portions, a spring-loaded work gripping means pivotally mounted on said handle pivot at its inboard end and being freely suspended forwardly thereof with respect to the forward jaw portion of said lower handle, and spring means fixed to said work gripping means forwardly of said handle pivot and slidably bearing upon said lower handle rearwardly of said handle pivot.

4. A cutter comprising in combination, a lower handle having a rearward hand-grip portion and a forward jaw portion with the jaw portion having a downwardly-facing working edge, an upper handle having a rearward hand-grip portion and a forward jaw portion with the jaw portion having an upwardly-facing working edge, a handle pivot pivotally interconnecting said upper and lower handles intermediate the respective hand grip portions and the jaw portions, a spring-loaded work gripping means pivotally interconnected with said upper and lower handles, and a semi-elliptic spring means having a forward end fixed to said work gripping means forwardly of said handle pivot and a rearward end in sliding relationship upon said lower handle rearwardly of said handle pivot for holding a workpiece with respect to the jaw member of said upper handle as the hand-grip portions of said upper and lower handles are compressed toward each other.

5. A cutter comprising in combination, a lower handle having a rearward hand-grip portion and a forward jaw portion with the jaw portion having a downwardly-facing working edge, an upper handle having a rearward hand-grip portion and a forward jaw portion with the jaw portion having an upwardly-facing working edge, a handle pivot pivotally interconnecting said upper and lower handles, a cantilevered spring-loaded work gripping means pivotally mounted on said handle pivot with respect to said upper and lower handles, and spring means fixed to said work gripping means forwardly of said handle pivot and slidably bearing upon and adjustably positionable relative to said lower handle rearwardly of said handle pivot as the hand-grip portions of said upper and lower handles are compressed toward each other for holding one part of a workpiece against the jaw portion of said upper handle as another part is severed therefrom.

6. In a pruning shears of the workpiece holding type comprising, a pair of articulated handles interconnected by a pivot means, coacting primary and secondary workpiece-severing jaws each operatively supported by one of the handles of said pair thereof, workpiece-gripping means pivoted upon the pivot means and supported in cooperative relation to said primary and secondary jaws and including a gripper element movable in yielding relation with respect to said primary and secondary jaws and a spring-biasing means fixed at its forward end to the gripper element forwardly of the handle pivotal means and having a sliding engagement at its rearward end upon said primary jaw rearwardly of the handle pivotal means, the gripper element of said workpiece-gripping means being in alignment with said secondary jaw for contact therewith when said jaws are in closed position relative to each other, the gripper element of said workpiece-gripping means having a workpiece-contact face opposing the workpiece-contact face of said secondary jaw.

7. A cutter comprising, a pair of levers each having a handle portion at one end, an anvil associated with the other end of the first of said levers, a blade associated with the other end of the second of said levers, a handle pivot for pivotally interconnecting said levers, a spring-biased gripper element pivoted upon said handle pivot spring means fixed to said gripper element forwardly of said handle pivot and having a sliding engagement upon said blade rearwardly of said handle pivot for biasing said gripper element into workpiece-holding position relative to said anvil as the handle portions of the levers of said pair thereof are compressed toward each other.

8. A cutter comprising, a pair of levers each having a handle portion at one end, an anvil associated with the other end of the first of said levers, a blade associated with the other end of the second of said levers, a handle pivot for pivotally interconnecting said levers, a spring-biased gripper element pivoted to said handle pivot, arcuate spring means having one end fixed to said gripper element forwardly of said handle pivot and an opposite end in sliding relationship with said blade rearwardly of said handle pivot for biasing said gripper element into workpiece-holding position relative to said anvil as the handle portions of the levers of said pair thereof are compressed toward each other.

9. A cutter comprising, a pair of levers each having a handle portion at one end, an anvil associated with the other end of the first of said levers, a blade associated with the other end of the second of said levers, a handle pivot for pivotally interconnecting said levers, a spring-biased gripper element pivotally mounted with respect to said blade, semi-elliptic spring means having one end fixed to said gripper element forwardly of said handle pivot and an opposite end having a sliding relationship with said blade rearwardly of said handle pivot for biasing said gripper element into workpiece-holding position relative to said anvil as the handle portions of the levers of said pair thereof are compressed toward each other.

10. A pruning cutter comprising, a pair of levers each having a handle portion at one end thereof, an anvil on the other end of one of said levers, a cutting blade on the other end of the other of said levers and confrontable with said anvil, pivot means interconnecting the levers of said pair thereof, a handle-biasing leaf spring associated with and separating the handle portions of the levers of said pair thereof, said cutting blade being movable into and out of contacting relationship with said anvil accordingly as the handle portions of the levers of said pair thereof are respectively compressed together and moved apart, a spring-biased gripper element pivoted to the levers of said pair thereof, and spring means having one end fixed to said gripper element for biasing said gripper element into workpiece-gripping position relative to said anvil and an opposite end for receiving the thrust of said handle-biasing leaf spring as the handle portions of the levers of said pair thereof are compressed.

11. A pruning cutter comprising, primary and secondary levers each having a handle portion at one end thereof, an anvil on the end of said primary lever, a cutting blade on the end of said secondary lever and confrontable with said anvil, pivot means interconnecting said levers, a handle-biasing leaf spring associated with and separating the handle portions of said levers, said cutting blade being movable into and out of contacting relationship with said anvil accordingly as the handle portions of said levers are respectively compressed together and moved apart, a spring-biased gripper pivoted to said levers, and spring means having one end fixed to said gripper for biasing said gripper into workpiece-gripping position relative to said anvil and an opposite loading end disposed intermediate said leaf spring and secondary lever loadingly-responsive to said leaf spring as the handle portions of said levers are compressed.

12. In a pruning cutter, a lower handle having a rearwardly-extending hand grip portion and a forwardly-extending off-set portion comprising a pair of spaced flanges, a cutting blade rigidly secured between the outer end portions of the spaced flanges of the off-set portion of said lower handle and having a downwardly-facing cutting edge, an upper handle pivotally interconnected to the spaced flanges of the off-set portion of said lower handle and having a hand grip portion extending rearwardly of the pivotal interconnection and an off-set portion comprising a pair of spaced flanges extending forwardly of the pivotal interconnection, an anvil pivotally interconnected to the spaced flanges of the offset portion of said upper handle and having an upwardly-facing edge adapted for line contact with the cutting edge of said cutting blade, a motivating link pendulantly mounted upon said lower handle rearwardly of the point of pivotal interconnection of said handles and having a lower extremity pivotally interconnected to said anvil rearwardly of the point of pivotal interconnection of said handles, and workpiece-gripping means supported in cooperative relation to said cutting blade and anvil and including a gripper element pivotally mounted with respect to said handles and movable in yielding relation with respect to said cutting blade and a spring-biasing means having one end fixed to the gripper element forwardly of the pivotal interconnection of said handles and an opposite end bearing upon said lower handle rearwardly of the pivotal interconnection, the gripper element of said workpiece-gripping means being positioned in opposed relation to the upwardly-facing working face of said anvil for contact therewith when said anvil and cutting blade are in closed position relative to each other, with said motivating link cooperantly with the gripper element of said workpiece-gripping means holding the workpiece in situ during the workpiece-severing process under compression of said handles into closed position and concomitant movement of said cutting blade in cutting direction into contact with said anvil.

13. A cutter comprising in combination, a lower handle having a rearward hand-grip portion and a forward primary jaw portion, the forward primary jaw portion of said lower handle having a downwardly-facing working edge, an upper handle having a rearward hand-grip portion and a forward secondary jaw portion, the forward secondary jaw portion of said upper handle having an upwardly-facing working face, pivot means pivotally interconnecting the forward primary and secondary jaw portions of said lower and upper handles respectively, workpiece-gripping means supported in cooperative relation to the primary and secondary jaw portions of said lower and upper handles respectively and including a gripper element pivotally mounted upon said pivot means and movable in yielding relation with respect to the primary and secondary jaw portions of said lower and upper handles respectively and a spring-biasing means having one end fixed to the gripper element forwardly of said pivot means and an opposite end bearing upon the primary jaw portion of said lower handle rearwardly of said pivot means, the gripper element of said workpiece-gripping means being positioned in opposed relation to said upwardly-facing working face of the secondary jaw portion of said upper handle for contact therewith when the jaw portions are in closed position relative to each other, and an auxiliary means constituted by a leaf spring fixed at one end to the hand-grip portion of one of said handles and bearing upon said spring-biasing means at the other end.

14. A cutter comprising in combination, a lower handle having a rearward hand-grip portion and a forward jaw portion with the jaw portion having a downwardly-facing working edge, an upper handle having a rearward hand-grip portion and a forward jaw portion with the jaw portion having an upwardly-facing working edge, a handle pivot pivotally interconnecting said upper and lower handles intermediate the respective hand grip portions and the jaw portions, a spring-loaded work gripping means pivotally interconnected with said upper and lower handles, and a semi-elliptic spring means having one end fixed to said work gripping means forwardly of said handle pivot and an opposite end in bearing relationship upon said lower handle rearwardly of said handle pivot for holding a workpiece against the jaw member of said upper handle as the hand-grip portions of said upper and lower handles are compressed toward each other, and an auxiliary leaf spring having an outboard end fixed to one of said handles and an inboard end bearing upon said spring means.

15. A cutter comprising in combination, a lower handle having a rearward hand-grip portion and a forward jaw portion with the jaw portion having a downwardly-facing working edge, an upper handle having a rearward hand-grip portion and a forward jaw portion with the jaw portion having an upwardly-facing working edge, a handle pivot pivotally interconnecting said upper and lower handles, a spring loaded work gripping means pivotally mounted with respect to said upper and lower handles, and spring means fixed to said work gripping means forwardly of said handle pivot and slidably bearing upon and adjustably positionable relative to said lower handle rearwardly of said handle pivot for holding a workpiece against said jaw member of said upper handle as the hand-grip portions of said upper and lower handles are compressed toward each other, and secondary spring means having an outboard end fixed to the hand-grip portion of one of said handles and an inboard end bearing upon and loading said spring means.

16. In a prunning shears of the workpiece holding type comprising, a pair of articulated handles interconnected by a pivot means, coacting primary and secondary workpiece-severing jaws each operatively supported by one of the handles of said pair thereof, workpiece-gripping means supported in cooperative relation to said primary and secondary jaws and including a gripper element pivotally mounted with respect to the handles of said pair thereof and movable in yielding relation with respect to said primary and secondary jaws and a spring-biasing means fixed to the gripper element forwardly of the handle pivotal means and bearing upon said primary jaw rearwardly of the handle pivotal means, the gripper element of said workpiece-gripping means being in alignment with said secondary jaw for contact therewith when said jaws are in closed position relative to each other, the gripper element of said workpiece-gripping means having a workpiece-contact face opposing the workpiece-contact face of said secondary jaw, and helper spring means fixed to one of the handles of said pair thereof for resiliently cushioning the spring-biasing means of said workpiece gripping means.

References Cited

UNITED STATES PATENTS

| | | | |
|---|---|---|---|
| 614,167 | 11/1898 | Gardella | 30—135 |
| 887,494 | 5/1908 | Mulertz | 30—135 |
| 1,458,878 | 6/1923 | Dexter | 30—134 |
| 1,862,556 | 6/1932 | Welhaven | 30—124 |
| 2,553,697 | 5/1951 | Zacrep | 30—135 |

FOREIGN PATENTS 2,441 8/1869 Great Britain.

WILLIAM FELDMAN, *Primary Examiner.*

J. C. PETERS, *Assistant Examiner.*